(12) United States Patent
Pu et al.

(10) Patent No.: US 8,281,012 B2
(45) Date of Patent: Oct. 2, 2012

(54) MANAGING PARALLEL DATA PROCESSING JOBS IN GRID ENVIRONMENTS

(75) Inventors: Xiaoyan Pu, Chelmsford, MA (US); Christopher S. Thornton, Heelands (GB)

(73) Assignee: International Business Machines Corporation, Armonk, NY (US)

( * ) Notice: Subject to any disclaimer, the term of this patent is extended or adjusted under 35 U.S.C. 154(b) by 1094 days.

(21) Appl. No.: 12/022,602

(22) Filed: Jan. 30, 2008

(65) Prior Publication Data

US 2009/0193427 A1    Jul. 30, 2009

(51) Int. Cl.
G06F 15/173 (2006.01)
G06F 9/46 (2006.01)

(52) U.S. Cl. ........................ 709/226; 718/104

(58) Field of Classification Search ................ 709/226, 709/229, 201–203; 718/102–105
See application file for complete search history.

(56) References Cited

U.S. PATENT DOCUMENTS

| | | | |
|---|---|---|---|
| 6,049,861 A | 4/2000 | Bird et al. | |
| 6,205,441 B1 | 3/2001 | Al-omari et al. | |
| 6,389,587 B1 | 5/2002 | Lewis | |
| 6,564,221 B1 | 5/2003 | Shatdal | |
| 6,832,248 B1 | 12/2004 | Byrnes | |
| 6,889,221 B1 | 5/2005 | Luo et al. | |
| 7,065,764 B1 * | 6/2006 | Prael et al. | 718/102 |
| 7,082,606 B2 * | 7/2006 | Wood et al. | 718/102 |
| 7,127,701 B2 | 10/2006 | Fables et al. | |
| 7,152,157 B2 | 12/2006 | Murphey et al. | |
| 7,174,379 B2 | 2/2007 | Agarwal et al. | |
| 7,266,807 B2 | 9/2007 | Takano et al. | |
| 7,426,570 B2 | 9/2008 | Andrzejak et al. | |
| 7,467,180 B2 | 12/2008 | Kaufman et al. | |
| 7,480,734 B1 | 1/2009 | Thakur et al. | |
| 7,543,006 B2 | 6/2009 | Brown et al. | |
| 7,861,246 B2 | 12/2010 | Lu et al. | |
| 8,108,512 B2 | 1/2012 | Howard et al. | |
| 2002/0059202 A1 | 5/2002 | Hadzikadic et al. | |
| 2002/0095525 A1* | 7/2002 | Fables et al. | 709/318 |
| 2003/0028642 A1 | 2/2003 | Agarwal et al. | |
| 2003/0065671 A1 | 4/2003 | Cardenas | |
| 2005/0125537 A1 | 6/2005 | Martins et al. | |
| 2005/0283782 A1* | 12/2005 | Lu et al. | 718/100 |
| 2006/0048157 A1 | 3/2006 | Dawson et al. | |
| 2006/0069717 A1 | 3/2006 | Mamou et al. | |
| 2006/0150159 A1 | 7/2006 | Fellenstein et al. | |
| 2006/0167966 A1 | 7/2006 | Kumar et al. | |
| 2007/0078960 A1 | 4/2007 | Dawson et al. | |
| 2007/0101000 A1 | 5/2007 | Childress et al. | |

(Continued)

OTHER PUBLICATIONS

Rubing Duan, Run-time Optimisation of Grid Workflow Applications, Grid Computing, 7th IEEE/ACM International Conference on Issue Date: Sep. 28-29, 2006, pp. 33-40.*

(Continued)

Primary Examiner — Chirag R Patel
(74) Attorney, Agent, or Firm — Kali Law Group, P.C.

(57) ABSTRACT

Method, system, and computer program product for managing parallel data processing jobs in grid environments are provided. A request to deploy a parallel data processing job in a grid environment is received. A plurality of resource nodes in the grid environment are dynamically allocated to the parallel data processing job. A configuration file is automatically generated for the parallel data processing job based on the allocated resource nodes. The parallel data processing job is then executed in the grid environment using the generated configuration file.

17 Claims, 7 Drawing Sheets

U.S. PATENT DOCUMENTS

| | | |
|---|---|---|
| 2007/0174290 A1 | 7/2007 | Narang et al. |
| 2008/0082933 A1* | 4/2008 | Howard et al. ............... 715/771 |
| 2008/0114870 A1 | 5/2008 | Pu |
| 2009/0012983 A1 | 1/2009 | Senneville et al. |
| 2009/0193427 A1 | 7/2009 | Pu et al. |

OTHER PUBLICATIONS

Ding, Zhaohui, et al., "Customized Plug-in Modules in Metascheduler Community Scheduler Framework 4 (CSF4) for Life Sciences Application", 14 Pages.

Coveney, P.V., et al., "The Application Hosting Environment: Lightweight Middleware for Grid-Based Computational Science", arXiv:Physics0609168 v1., Sep. 20, 2006, 29 Pages.

Pu, Xiaoyan, et al., "IBM Information Server Blade—Deep Dive", IBM Information on Demand 2007, Oct. 14-19, 2007, 31 pages.

Abramson et al., "Nimrod/K: Towards Massively Parallel Dynamic Grid Workflows", IEEE SC2008, (Nov. 2008) Austin TX, 978-1-4244-2835-9/08, 11 pp.

Adve, et al., "Parallel Program Performance Prediction Using Deterministic Task Graph Analysis," (Feb. 2004) ACM Transactions on Comp Sys., vol. 22, No. 1, pp. 94-136.

Ahituv, et al., "A Model for Predicting and Evaluating Computer Resource Consumption," (Dec. 1988) Communications of the ACM, vol. 31, No. 12, pp. 1467-1473.

Duan et al., "Run-Time Optimisation for Grid Workflow Applications", IEEE Grid Computing Conference 2006, (Aug. 2006) 1-4244-0344-8/06, pp. 1-8.

Juhasz et al., "Execution Time Prediction for Parallel Data Processing Tasks," (2002) 2002 IEEE, 10th Euromicro Workshop on Parallel, Distributed & Network-based Processing (EUROMICOR-PDP '02), 8 pp.

Levine, et al., "A Resource Estimation and Call Admission Algorithm for Wireless Multimedia Networks Using the Shadow Cluster Concepts," (Feb. 1997) IEEE/ACM Trans on Networking, vol. 5, No. 1, pp. 1-12.

Madden et al., "The Design of an Acquisitional Query Processor for Sensor Networks", (Jun. 2003) SIGMOD 2003, San Diego CA USA, ACM 1-58113-634, pp. 491-502.

Milder, et al., "Fast and Accurate Resource Estimation of Automatically Generated Custom DFT IP Cores", (Feb. 2006) Monterey CA USA, FPGA '06, pp. 211-220.

Qiu, et al., "A Predictive Flow Control Scheme for Efficient Network Utilization and QoS," (Feb. 2004) IEEE/ACM Trans on Networking, vol. 12, No. 1, pp. 161-172.

Thornton et al., "Resource Estimation for Parallel Architectures with Distributed Processor/Memory Nodes", (1998) Jrnl. of Computing and Info Tech, CIT 6, pp. 359-371.

Yang, et al., "Cross-Platform Performance Prediction of Parallel Applications Using Partial Execution," (Nov. 2005) ACM/IEEE, SCO5 Conf/Nov. 12-18, 2005, Seattle WA USA, 11 pp.

Zinn, "Modeling and Optimization of Scientific Workflows" (Mar. 2008) EDBT 2008 Ph.D. Workshop '08 Nantes France, ACM 978-1-59593-968, pp. 1-10.

* cited by examiner

FIG. 5

```
Grid master configuration file on RHTEST01
Configurations:
[ master_config.apt  ▼ ]

// Information on static Grid resources is defined and maintained in this file.
// This file supports C++ style comments. Remove comments and edit node entries for fixed-name
// servers to setup your Grid environment. !
{
    // Conductor node entry
    node "CONDUCTOR"
    {
        fastname "rhtest01"
        pools "" "conductor"
        resource disk "/opt/IBM/InformationServer/Server/Datasets" {pools ""}
        resource scratchdisk "/opt/IBM/InformationServer/Server/Scratch" {pools ""}
    }
    // Compute node entry
    node "COMPUTE_default"
    {
        fastname "$HOSTNAME"
        pools ""
        resource disk "/u1/Datasets" {pools ""}
        resource disk "/u1/Lookup" {pools "lookup"}
        resource disk "/u1/SurrogateKey" {pools "keystate"}
        resource scratchdisk "/u1/Scratch" {pools ""}
    }
    // Node entries for fixed-name servers
    node "DB2"
```

Check Configuration Output

[ Close ]  [ Save ▶ ]  [ Check ]  [ Delete ]  [ Help ]

MANAGING PARALLEL DATA PROCESSING JOBS IN GRID ENVIRONMENTS

BACKGROUND

With a parallel data processing job, a configuration file is typically created by a user before runtime to describe resources (e.g., storages, servers, and so forth) to be used for executing the parallel data processing job. At runtime, the configuration file is analyzed to determine whether the resources described in the configuration file are available.

In a grid environment, however, certain resources to be used for executing jobs are dynamically allocated at runtime. Given that some resources to be used for executing a parallel data processing job in the grid environment will not be known until runtime, it will not be possible to create a configuration file for the parallel data processing job prior to runtime.

SUMMARY

Method, system, and computer program product for managing parallel data processing jobs in grid environments are provided. In one implementation, a request to deploy a parallel data processing job in a grid environment is received. A plurality of resource nodes in the grid environment are dynamically allocated to the parallel data processing job. A configuration file is automatically generated for the parallel data processing job based on the plurality of resource nodes dynamically allocated to the parallel data processing job. The parallel data processing job is then executed in the grid environment using the configuration file generated for the parallel data processing job.

DESCRIPTION OF DRAWINGS

FIGS. 4-7 depict sample screenshots of an application for managing parallel data processing jobs in grid environments according to various implementations.

DETAILED DESCRIPTION

This disclosure generally relates to managing parallel data processing jobs in grid environments. The following description is provided in the context of a patent application and its requirements. Accordingly, this disclosure is not intended to be limited to the implementations shown, but is to be accorded the widest scope consistent with the principles and features described herein.

A data-flow model is sometimes used to design parallel data processing jobs (e.g., jobs to process data from one or more partitions simultaneously). With the data-flow model, a data flow graph and a configuration file are created for each parallel data processing job. The configuration file for each parallel data processing job handles the underlying parallelism of the job and specifies system resources (e.g., servers, storages, and so forth) to be used for executing the job. Upon execution of the data flow graph for a parallel data processing job, the configuration file for the parallel data processing job is analyzed to determine whether the system resources specified in the configuration file are available.

Typically, configuration files are manually created prior to deployment (e.g., before runtime), such as while designing the parallel data processing jobs. Creating configuration files before runtime, however, is not possible in a grid environment because certain system resources are dynamically allocated at runtime. Hence, not all system resources to be used for executing a parallel data processing job in the grid environment will be known prior to deployment. As a result, there is a very short window of time in which to create a configuration file for the parallel data processing job (e.g., after resource allocation and before execution).

System resources specified in configuration files are usually machine names of the system resources. Consequently, a configuration file created for a parallel data processing job in one environment generally cannot be used in another environment. To given an example, suppose a configuration file is created for a parallel data processing job in an environment with one set of servers. If the parallel data processing job is to be executed in another environment with a different set of servers, then a new configuration file will have to be created because the machine names for the servers will be different.

Figure 1:
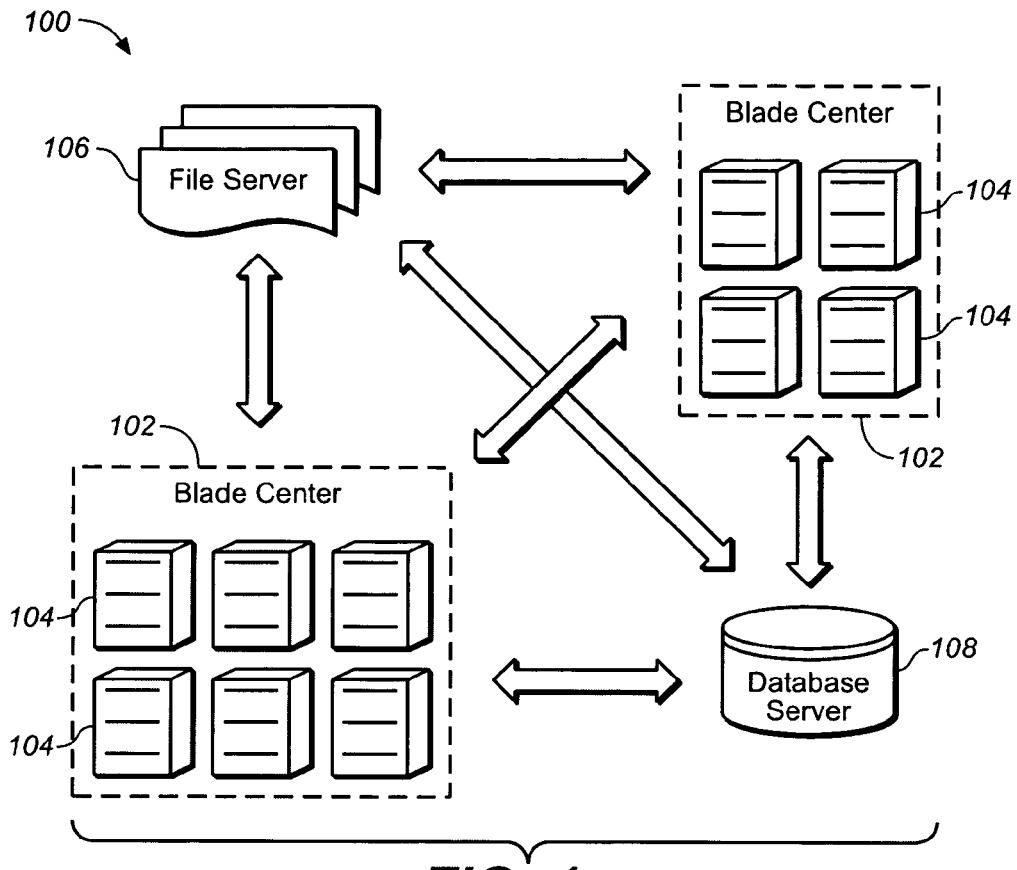
FIG. 1 depicts an example of a grid environment according to an implementation.

Depicted in FIG. 1 is an example of a grid environment 100 according to an implementation. Grid environment 100 includes blade centers 102 that each includes a plurality of server blades 104. Each server blade 104 has all essential functional components of a computer (e.g., processor(s), memor(ies), and so forth). Non-essential components, such as power, cooling, networking, and so forth, are provided through an enclosure (not depicted) of each blade center 102. Each blade center 102 may include more or less server blades 104 in other implementations.

Grid environment 100 also includes a file server 106 and a database server 108. In other implementations, grid environment 100 may include more or less blade centers, server blades, file servers, and database servers (not depicted). Additionally, grid environment 100 may include other resources, such as storages (not depicted).

Each server, server blade, or the like in grid environment 100 may be referred to as a 'physical node' in grid environment 100. Within each 'physical node', there may be one or more 'logical nodes' or 'partitions'. For example, a server blade with dual processors can include two logical nodes, one node running on each processor. The term 'resource node' will be used herein to refer to any physical or logical node in a grid environment.

Some of the physical nodes in grid environment 100, such as certain server blades 104, will be designated as 'compute nodes' to be used exclusively for computing purposes. Compute nodes are considered to be dynamic grid resources as they are dynamically allocated to jobs at runtime. In contrast, fixed-name servers, such as file server 106 and database server 108, are considered to be static resources, also referred herein to as 'static nodes'. Disk information in each compute node is also considered to be a static resource.

Figure 2:
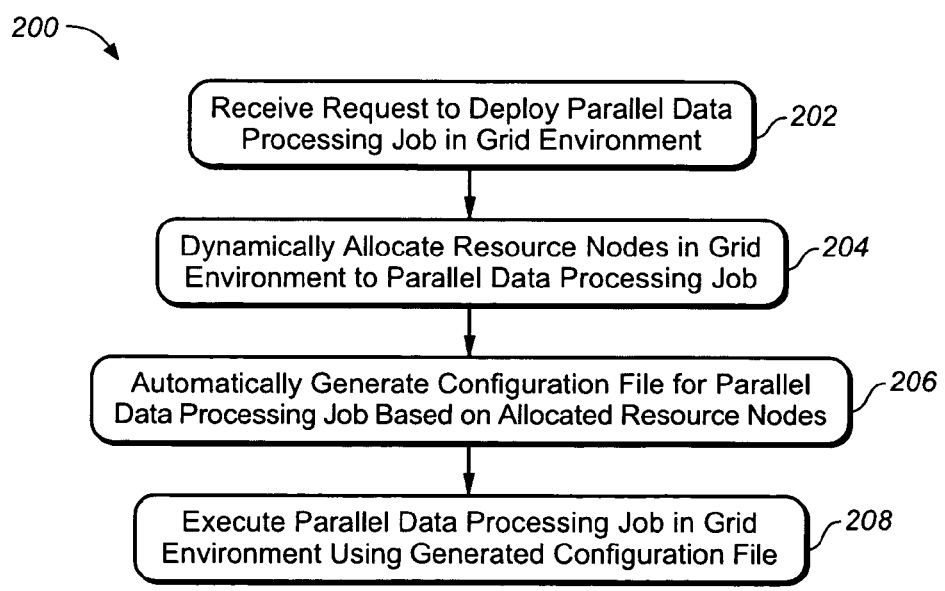
FIG. 2 illustrates a process for managing parallel data processing jobs in grid environments according to an implementation.

FIG. 2 illustrates a process 200 for managing parallel data processing jobs in grid environments according to an implementation. At 202, a request to deploy a parallel data processing job in a grid environment is received. A plurality of resource nodes in the grid environment is dynamically allocated to the parallel data processing job at 204. In one implementation, the plurality of resource nodes includes one or more compute nodes.

At 206, a configuration file is automatically generated for the parallel data processing job based on the plurality of resource nodes dynamically allocated to the parallel data processing job. In one implementation, automatic generation of the configuration file is also based on a configuration file template for the grid environment and one or more other resources (e.g., static nodes, disk information, storages, or the like) in the grid environment. The parallel data processing job is then executed in the grid environment at 208 using the configuration file automatically generated for the parallel data processing job. Process 200 may be running on one or more server blades 104 in grid environment 100 of FIG. 1. Process 200 could also be running on, for instance, file server 106 or database server 108 in grid environment 100 of FIG. 1.

In one implementation, dynamic allocation of the plurality of resource nodes to the parallel data processing job is based on resource requirements specified for the parallel data processing job and a configuration file template for the grid environment. The resource requirements for the parallel data processing job may be specified when designing the parallel data processing job or may be parameterized so that the resource requirements can be specified at runtime. Parameterizing resource requirements allows resource requirements to be changed without changing the parallel data processing job.

The resource requirements for the parallel data processing job may be specified as a plurality of node pools to be used for the parallel data processing job. Each node pool correlates to resource nodes with a particular characteristic. For example, there may be a node pool for database servers, another node pool for file servers, and the like. The configuration file template maps the plurality of node pools specified in the resource requirements for the parallel data processing job to the plurality of resource nodes dynamically allocated to the parallel data processing job. Resource requirements for the parallel data processing job may further be specified as a number of nodes from each of the plurality of node pools to be used for the parallel data processing job.

The configuration file template for the grid environment may be a job level template that only includes information on node pools useful for the parallel data processing job. In other words, the configuration file template may not include information on all node pools in the grid environment. For example, suppose the parallel data processing job solely involves processing database data. As a result, a node pool correlating to file servers need not be included in the configuration file template. Other configuration file templates may be created for the grid environment, which could be at other levels, such as project level, master level (e.g., all node pools), and so forth. In one implementation, the configuration file template for the grid environment and the configuration file generated for the parallel data processing job have a same format.

In one implementation, the parallel data processing job was designed in an environment different from the grid environment. For example, the parallel data processing job may have been designed in a non-grid environment, such as a SMP (Symmetrical Multi-Processing) environment, an MPP (Massive Parallel Processing) environment, etc., or in a grid environment with different type and/or number of resource nodes. The parallel data processing job can also be deployed in an environment different from the grid environment without having to be modified.

The parallel data processing job can be designed in one environment and deployed in multiple environments without modification because resource requirements are specified in terms of node pools. As long as the node pool names are consistent across different environments and a configuration file template is created for each environment to map node pools to resource nodes in the particular environment, then parallel data processing jobs defined in one environment should be deployable in another environment with no changes.

Resource constraints may be defined for the parallel data processing job. For example, a resource constraint defined for the parallel data processing job may require a stage of the parallel data processing job to execute on a particular resource node. This may be useful for stages of a job that are not processor-intensive. When a resource constraint is defined for the parallel data processing job, generation of the configuration file takes the resource constraint into account.

In one implementation, the parallel data processing job is part of a job sequence and the configuration file generated for the parallel data processing job is used for executing another parallel data processing job in the job sequence. Resource requirements for parallel data processing jobs in the job sequence may be defined at the sequence level such that all parallel data processing jobs in the job sequence are executed using the same configuration file. Jobs in a sequence may also deploy with their own resource requirements. In that case, different configuration files will be generated for each job in the sequence.

Execution of the parallel data processing job may involve locking one or more of the plurality of resource nodes dynamically allocated to the parallel data processing job. This should improve performance as multiple jobs will not be vying for the same resource nodes in the grid environment. Rather than scheduling execution of the parallel data processing job based on time, the parallel data processing job may instead be scheduled based on resource requirements specified for the job.

Since the configuration file for the parallel data processing job is not generated until runtime, it may be problematic to validate the job prior to deployment. In one implementation, a temporary configuration file containing fixed-named servers and dummy compute nodes is created to validate the parallel data processing job without actually deploying the parallel data processing job.

Certain non-job commands depend on resource configuration to run successfully. For example, a command to manipulate data produced from execution of a parallel data processing job may need the configuration file used during execution of the parallel data processing job in order to run. Hence, in one implementation, rather than re-executing the parallel data processing job, a temporary configuration file is generated based on resource requirements specified by the parallel data processing job.

Figure 3:
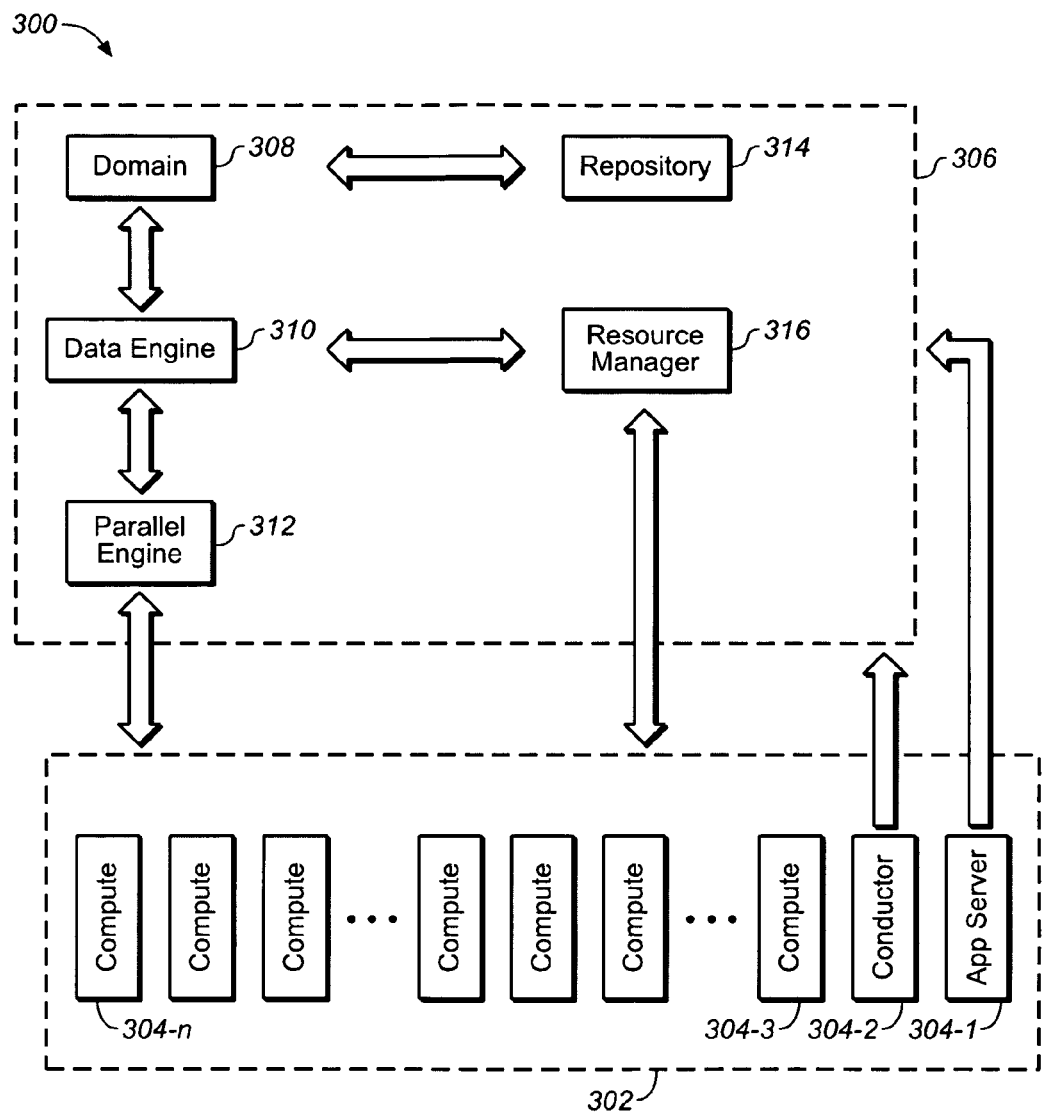
FIG. 3 shows a system according to an implementation.

Shown in FIG. 3 is a system 300 according to an implementation. System 300 includes a blade center 302 with a plurality of server blades 304. Blade center 302 may include more or less server blades in other implementations. System 300 also includes an application 306 running on server blades 304-1 and 304-2. Application 306 manages parallel data processing jobs in system 300. Application 306 includes a domain 308, a data engine 310, a parallel engine 312, a repository 314, and a resource manager 316. In one implementation, resource manager 316 may be a stand-alone application separate from application 306.

Domain 308 communicates with external clients (not shown) and processes requests from the external clients. Data engine 310 is responsible for setting up for parallel execution, communicating with resource manager 316 to automatically generate configuration files at runtime, executing jobs, displaying job logging and monitoring information to external clients, and so forth.

Parallel engine 312 implements parallelism on blade center 302, creates and allocates processes on logical and physical nodes in system 300, coordinates inter-process communications for data movements among nodes in system 300, collects messages from all running jobs on all server blades 304, and so forth. Repository 314 is used to store, for instance, configuration file templates, job resource requirements, or the like.

Resource manager 316 dynamically allocates resources and manages scheduling of jobs. For example, resource manager 316 can queue jobs that request the same resources or when there are not enough compute nodes to run a job. Resource manager 316 can also lock resources allocated to a running job, launch a new job once a previous job finishes, and so forth.

The following sections present examples of various implementations of application 306. The first section presents a functional overview of a variety of features of application 306 in the various implementations. Subsequent sections describe the variety of features of application 306 in further detail.

Functional Overview

There are two major areas that need to be considered: resource configuration and resource management. Key components related to resource configuration include resource specification, resource constraint, job sequence, job batch, job deployment, configuration file generation, job validation, and non-job commands. Resource management is achieved by integrating data engine 310 with resource manager 316 for job execution, job control, and job report.

Resource specification provides users with an interface to define a number of compute and static nodes needed for a job to run. Using a pre-created configuration file was the traditional approach. With application 306, a user just needs to specify job resource requirements in terms of a few numbers, such as a minimum and a requested number of compute nodes, a number of partitions for each compute node or a node pool of fixed-name servers. The user can simply accept default values or specify a different value for each number when needed.

User-specified values can be job parameter strings whose actual values are given at runtime. This makes it easy for users to change, for instance, the number of partitions required per compute node, without having to modify the job design. The default and user-specified resource requirements are stored with a job design, which are further stored into compiled job runtime by a job compiler.

Resource constraint allows a user to explicitly designate a stage of a job to run on a specific server. This is especially useful for job stages that are not CPU intensive, such as a database stage that needs to access tables, a file stage that needs to perform I/O on storage resources, a SAS (Statistical Analysis System) stage that needs to interact with third-party application software.

For performance considerations, these types of stages can be constrained to run on appropriate resources. Traditionally, in order to apply any resource constraints, a user must create a configuration file, assign the processing nodes associated with a fixed-name server to node pools, and set an environment variable to point to the configuration file. This task is largely simplified in application 306.

Information on static grid resources can be defined and maintained in a master configuration file template, which can be generated as a part of an install process. Privileges to view and update information in the master configuration file template may be limited to a system administrator. The system administrator can also create configuration file templates on top of the master configuration file template based on, for instance, each project's or job's resource needs, to create different views of grid resources. Users of each project/job can only see the grid resources (e.g., node pools) specified in the configuration file template for that project/job. Therefore, the information exposed to users can be reduced to a minimum.

In addition, with customized views of grid resources at project/job level, a user can more easily find resources that are needed by a particular job. Resource constraints can also be easily applied to stages of a job because node and node pool names of fixed-named servers will be known.

A job sequence includes one or multiple activities, which can be executables, jobs, routines, scripts, or the like. In a traditional resource configuration approach, if a user wants to run all jobs in the same job sequence using the same configuration file, the user must repeatedly set the configuration file parameter for each job. With application 306, the user can choose to specify resource requirements for the job sequence and force jobs in the sequence to use sequence-level resources rather than reallocating resources separately for each job. The configuration file generated at runtime is automatically applied to each job.

Alternatively the user may choose to have the sequence jobs obtain their resources independently. Application 306 allows job sequences to be designed and tested off-grid with grid interfaces enabled, then deployed on-grid. No customization or use of special scripts is required.

Multiple jobs or separate invocations of the same job can be grouped to run in a job batch, or as job control at the start of another job run. A batch file is simply a special-case of a server job with job control, but with no stages of its own. A server job is a job supported by data engine 310 in contrast to a parallel job supported by parallel engine 312. The default action is for jobs in job control to run with their own resource settings, unless a fixed configuration file setting is used.

Unlike the traditional approach, which doesn't have a mechanism to deploy resource configuration information, application 306 supports resource configuration deployment in heterogeneous environments. For example, users can design a job and specify job resource requirements in a SMP development environment with grid interfaces enabled, and run the job in a grid environment without modifying the job design and resource configuration.

Persistent information on resource configuration is exported with the job design. Since server names may not be consistent across different environments, they are not stored as part of the persistent resource configuration information during job deployment. Instead, node pool names are used to interpret and coordinate the resource requirements between different environments.

In a grid environment, such as system 300, application 306 automates the process of creating configuration files. Application 306 dynamically creates configuration files based on job resource configuration information. When the actual configuration file is generated in the grid environment, node resolution for static server names may be done first, followed by node resolution for dynamic compute node names.

A job can be validated to ensure a successful run. Although the job is not actually executed and data is not affected, a configuration file must be specified for resource configuration to be checked as part of job validation. This is not a problem for the traditional approach, as the configuration file is either set to the default one or the one specified by the user. However, this definitely introduces an issue in a grid environment where a configuration file is not generated until runtime after the requested resources are allocated.

Using a dynamically generated configuration file for job validation requires that the job be submitted to resource manager 316. The job, however, could be queued up for a long time waiting to obtain processing nodes. Because of this, a temporary configuration file containing fixed-name servers and dummy processing nodes can be created for job validation. Hence, the job need not be submitted to resource manager 316.

System Configuration

Figure 4:
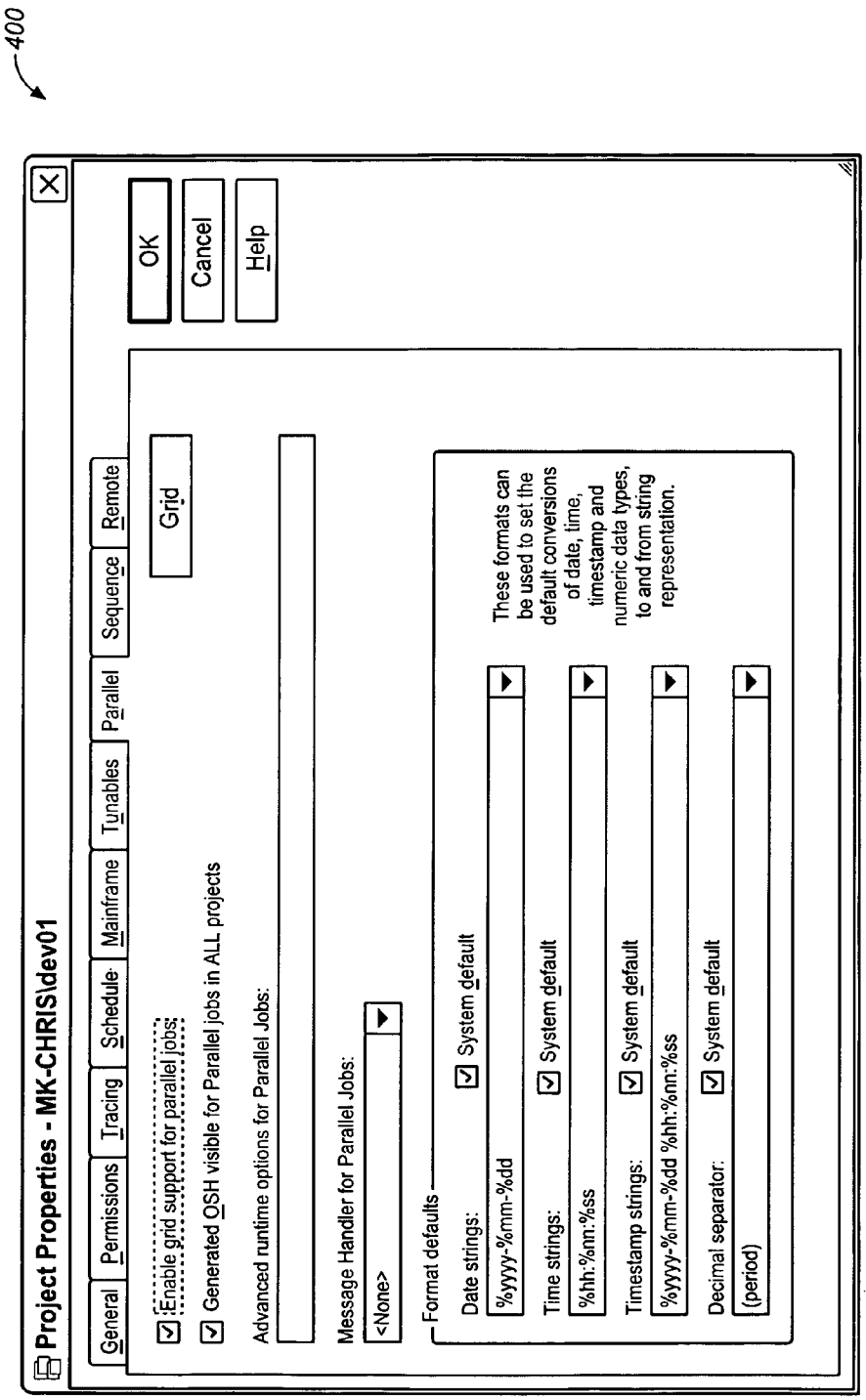

The ability to design a parallel data processing job off-grid (e.g., in a non-grid environment) when the parallel data processing job is to be deployed on-grid (e.g., in a grid environment) can be provided as an option in application 306. FIG. 4 illustrates a sample screenshot 400 of application 306 providing such option to users at a project level according to an implementation.

At post-install time when resource manager 316 has been installed and configured, a new file may be created to include specific parameters, such as path of executable, environmental variables, and so forth. The list of parameters contained in this file may vary depending on the resource manager installed. This file can be used by a client application to determine whether the parallel execution environment is a grid environment. If so, which resource manager is available, a path name for the resource manager, and so forth.

Master Configuration File Template

As mentioned above, the information on static grid resources is defined and maintained in a configuration file template. In one implementation, the format of this template is the same as that of a configuration file. This template is copied into a home directory of parallel engine 312 during install. A logical node entry for conductor node 304-2 and a default logical node entry for compute nodes 304-3 to 304-n are updated by blade server install scripts.

By default, conductor node 304-2 is assigned to a conductor node pool, and all compute nodes 304-3 to 304-n are assigned to a default compute node pool. Application server node 304-1 may be assigned to another node pool depending on the type of application, such as a database server node pool if application server node 304-1 is a database application server node.

Users may be able to create additional logical compute node entries to define different storage resources. This would allow different projects to use storage resources that are mounted on different file systems. Sample logical node entries for fixed-name servers are commented out. Information on those nodes needs to be manually updated by a system administrator. For a static system with multiple fixed-name servers (e.g., database, file, etc.), the system administrator needs to create a logical node entry for each type of server.

A property may be added to an administration client for viewing and editing information in the master configuration file template. A variant of a standard configuration file editor may be used for editing the master configuration file template. FIG. 5 illustrates a sample screenshot 500 of a master configuration file template editor provided by application 306 according to an implementation.

In FIG. 5, a check button 502 is provided to allow users to perform a number of semantic checks on a master configuration file template. The following is a list of checks that may be performed, which are specific to configuration required for grid usage:

Compute nodes are required to be in a default node pool
Compute nodes must not be in any other node pool
Conductor node must be in a conductor node pool
Fixed nodes and conductor nodes must not be in the default node pool
All fixed nodes must be in at least one node pool Assuming the checks pass, other checks may be performed on the master configuration file template. Below is a sample master configuration file template:

```
// Information on static grid resources is defined and maintained in this file.
// This file supports C++ style comments. Remove comments and edit node entries for fixed-name
// servers to setup your Grid environment.
{
    // Conductor node entry
    node "CONDUCTOR"
    {
        fastname "development_conductor_node"
        pools "conductor"
        resource disk "/u1/Datasets" {pools ""}
    }
    // Compute node entry
    node "COMPUTE_default"
    {
        fastname "$HOSTNAME"
        pools ""
        resource disk "/u1/Datasets" {pools ""}
        resource disk "/u1/Lookup" {pools "lookup"}
        resource disk "/u1/SurrogateKey" {pools "keystate"}
        resource scratchdisk "/u1/Scratch" {pools ""}
    }
    // Node entries for fixed-name servers
    //node "DB2"
    //{
    //    fastname "development_db2"
    //    pools "DB2"
    //    resource scratchdisk "/u1/Scratch" {pools ""}
    //}
    //node "SAN"
    //{
    //    fastname "development_io_node"
    //    pools "io"
    //    resource disk "/u1/Datasets" {pools ""}
    //}
    //node "SORT"
    //{
    //    fastname "development_sort_node"
    //    pools "sort"
    //    resource scratchdisk "/u1/Scratch" {pools ""}
    //}
    //node "INFORMIX"
    //{
    //    fastname "development_informix"
    //    pools "INFORMIX"
    //    resource scratchdisk "/u1/Scratch" {pools ""}
    //}
    //node "SAS"
    //{
    //    fastname "development_sas"
    //    pools "sas"
    //    resource sas "/usr/sas612" { }
    //    resource sasworkdisk "/u1/sas/work" { }
    //    resource disk "/u1/sas" {pools ""}
    //    resource scratchdisk "/u1/Scratch" {pools ""}
    //}
}
```

Processing nodes in this template are described using the same resource configuration format defined by parallel engine 312. Therefore, the file can be parsed utilizing a configuration file parser. The master configuration file template is not an extension to resource manager's 316 configuration. It does not list the names of server blades 304, only the default settings for those blades 304. This template can also serve as a unified interface between data engine 310 and resource manager 316, so that the configuration file parser will not be impacted by any changes (e.g. keywords/syntax of specifying machine information) made into resource manager 316.

It is not necessary to use reserved logical node names in the master configuration file template. However, using meaningful names such as "SAN", "DB2", and so forth is recommended as it definitely helps understand what each logical node is by just looking at the name. Fastnames are displayed for a user to select the static part of job resource requirements. Because resource requirements are represented against node pool names, node pool names must be consistent across master configuration files in different environments to which jobs are deployed. For node map constraints, logical node names must be consistent as well. A logical node may be present in multiple node pools, but its name must be unique among all the logical node names in the master configuration file template.

Project Configuration File Template

It is possible that different projects have different resource configuration requirements. For example, storage resources of different projects may be mounted on different file systems. Jobs in one project may need to access database servers and can only run in one designated node pool. Jobs in another project may need to access file servers and can only run in another designated node pool.

Using the same master configuration file in both projects could result in exposing too much irrelevant information to these projects. Therefore, a way is provided for customizing the master configuration file template based on each project's needs. Supporting the project configuration file template allows a system administrator (or a user with administration privileges) to include only those node pools that are relevant to the project.

An administrator can create project-level views on top of the centralized view provided by the master configuration file template for each project's resource needs. An option may be added to an administration client to display a list of node pools. Each node pool entry can be expanded to show fixed-name servers (e.g., server name, logical node names, and default partition count per server) and settings of storage resources (e.g., resource disk, lookup resource disk, surrogate key resource disk, and scratch disk) for compute nodes.

Figure 6:
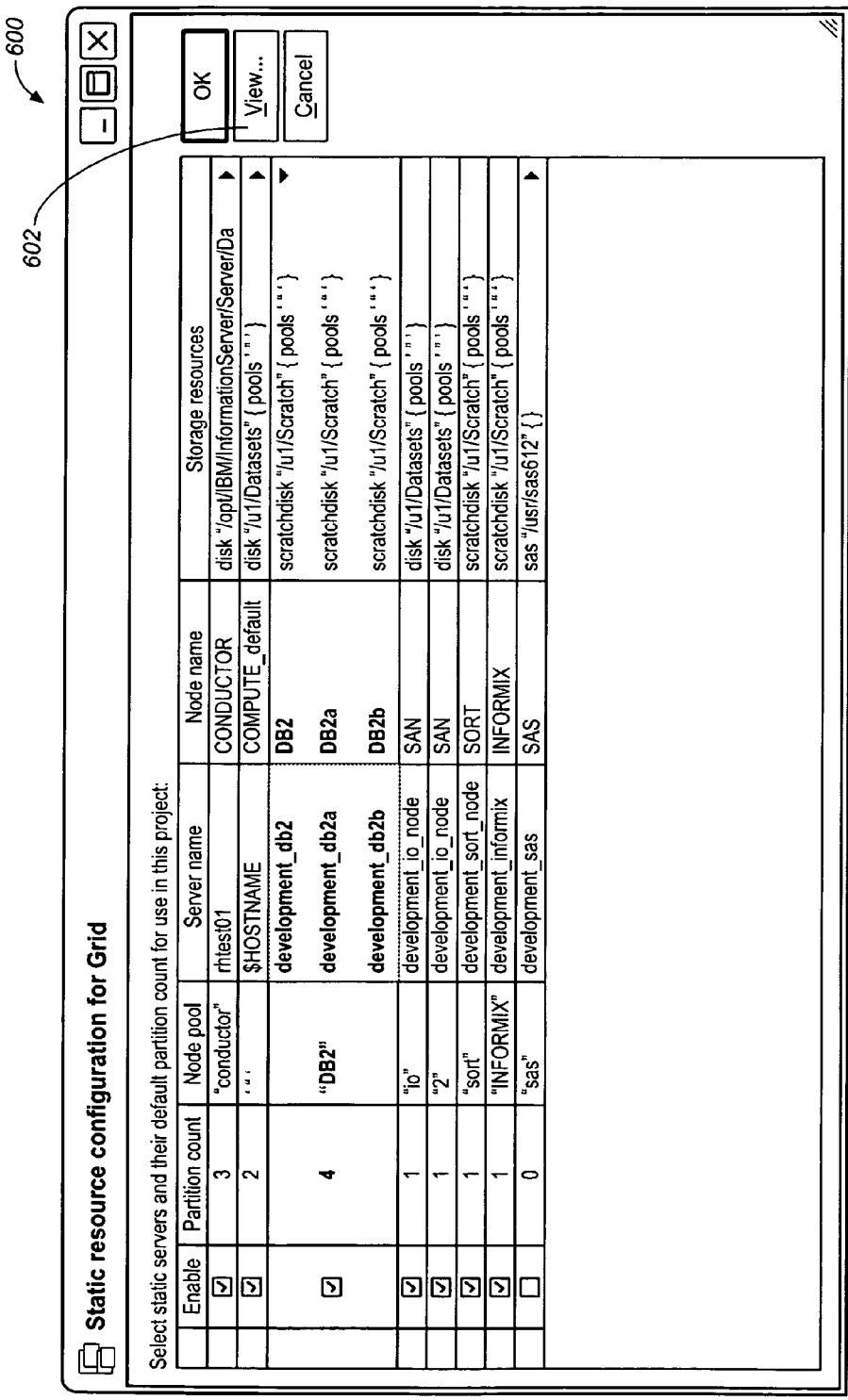

FIG. 6 is a sample screenshot 600 of application 306 showing a centralized view of static resources for a grid environment. By default, all nodes may be selected. An administrator-level user can de-select those node pools that should be excluded from a project-level view, except the conductor node pool. The conductor node pool must be present in a project configuration file template. Server names, logical node names, and node pool names are not editable. Apart from the selection checkbox, the only editable field is the partition count for the static node pool containing fixed-name servers.

When there are several nodes in a pool or when storage resources occupy more than one line, normally only a first row is shown in a cell, with a right-arrowhead at the end of the cell to indicate more lines. If a line is selected, the cell expands to show all its content lines, and the right-arrowhead changes to a down-arrowhead. Hence, clicking on a line alternately hides and reveals additional content. This is shown in FIG. 6 for the "DB2" node pool. When another line is chosen, the multi-line cells revert to showing only one line.

The data included in the project-level view is used to generate a project configuration file template. The configuration information on each server is retrieved from the master configuration file template, plus the configuration information on dummy compute node in that template. Adding the compute node information to the project configuration file template helps avoid creating additional intermediate configuration files needed by job validation. For example, when a user clicks on a view button 602 shown in screenshot 600, the following a project configuration file template is generated:

```
{
    node "CONDUCTOR"
    {
        fastname "rhtest01"
        pools "conductor"
        resource disk "/opt/IBM/InformationServer/Server/Datasets"
        { pools "" }
        resource scratchdisk
        "/opt/IBM/InformationServer/Server/Scratch" { pools "" }
    }
    node "COMPUTE_default"
    {
        fastname "$HOSTNAME"
        pools ""
        resource disk "/u1/Datasets" { pools "" }
        resource disk "/u1/Lookup" { pools "lookup" }
        resource disk "/u1/SurrogateKey" { pools "keystate" }
        resource scratchdisk "/u1/Scratch" { pools "" }
    }
    node "DB2"
    {
        fastname "development_db2"
        pools "DB2"
        resource scratchdisk "/u1/Scratch" { pools "" }
    }
    node "DB2a"
    {
        fastname "development_db2a"
        pools "DB2"
        resource scratchdisk "/u1/Scratch" { pools "" }
    }
    node "DB2b"
    {
        fastname "development_db2b"
        pools "DB2"
        resource scratchdisk "/u1/Scratch" { pools "" }
    }
    node "SAN"
    {
        fastname "development_io_node"
        pools "io" "2"
        resource disk "/u1/Datasets" { pools "" }
    }
    node "SORT"
    {
        fastname "development_sort_node"
        pools "sort"
        resource scratchdisk "/u1/Scratch" { pools "" }
    }
    node "INFORMIX"
    {
        fastname "development_informix"
        pools "INFORMIX"
        resource scratchdisk "/u1/Scratch" { pools "" }
    }
}
```

The logical content of the project configuration file template can be used by explicit resource constraints to display nodes and node pools on a screen, and to automatically generate a configuration file at runtime based on specific resource requirements of each job. The centralized view must be synchronized with the master configuration file template before displaying the list of fixed-name servers. An administration client may issue a warning when it detects changes in the master configuration file template since the current centralized view was created, especially for the situation where node pools in the current project configuration file template have been removed from the master configuration file template.

Resource Specification

Figure 7:
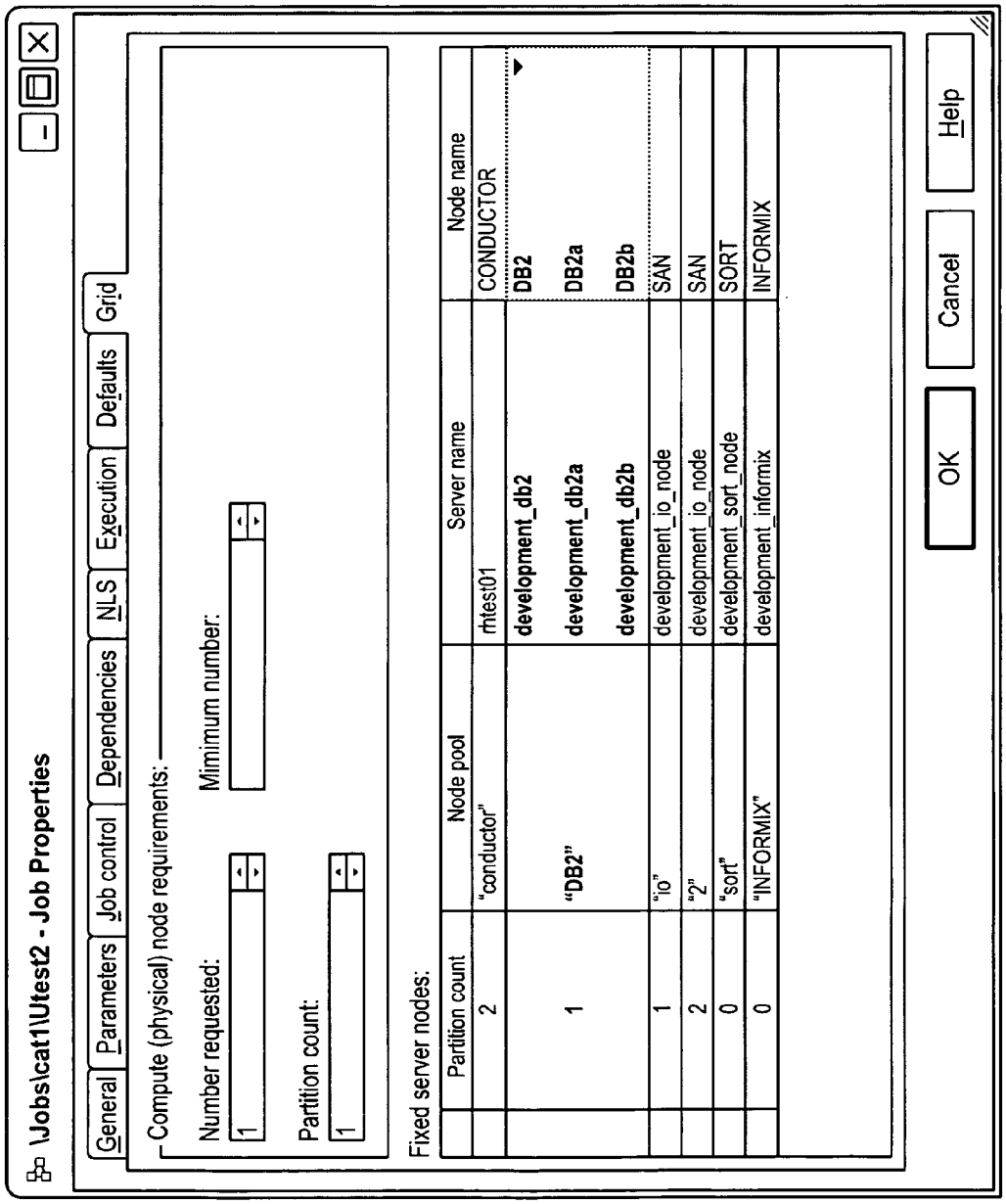

FIG. 7 depicts a sample screenshot 700 of application 306 according to an implementation. In FIG. 7, an interface is provided for users to specify job resource requirements while designing a parallel data processing job using application 306. The resource information contained in the project configuration file template shown in FIG. 6 is referenced. The following properties are displayed in the interface:

Number of requested compute (physical) nodes (default value field is set to 1).

Minimum number of compute nodes (default value field is left empty). May be set to the minimum number of nodes which will be accepted if the number requested is not available.

Number of partitions per compute node or static node pool (default value field is set to 1).

The table in the lower part of the interface contains information organized by node pools. The first line is the conductor node pool, then any further node pools corresponding to fixed nodes in the system. For each pool, the physical server name and the node name for machines in that pool are shown. On an administrator client, lines on a configuration screen may be expanded where more than one node is in the pool.

A user can accept the default values or specify a different value for each field. Other resource configurations, such as locations of resource disk, lookup resource disk, surrogate key resource disk, scratch disk, etc. are not displayed, because they are common resources shared by all blade servers 304 and should only be editable by an administrator. In the interface depicted in FIG. 7, for static node pools, only the partition count cells can be edited. The user may set a partition count of zero to exclude a node pool from use in a job design.

Instead of specifying resource requirements as described above, the user can choose to use a static configuration file. Although this is not recommended, using a static configuration file may be helpful for debugging and performance tuning purposes under certain circumstances. In addition, since the user cannot select specific compute nodes in the resource specification interface, the user should be able to do so using static configuration files when needed. In this case, the user must explicitly set an environment variable to a pre-created configuration file. The fastname, logical node name, and node pool names of the compute node names are retrieved from the configuration file along with those of the fixed-name servers. A fixed configuration file, however, cannot be used as a shortcut to avoid a (possible) wait for resource allocation since compute node fastnames will be requested for the job.

In a non-grid development environment where grid-enabled jobs are designed, an environment variable must be set to a pre-created configuration file; otherwise, the project default configuration file is used. Default and user-specified resource requirements are stored in the job design, keyed by node pool name. These are further stored into compiled job runtime by job compiler.

Resource Constraint

A project configuration file template may be referenced at job design time to display the list of nodes and node pools available. Jobs using data engine 310 functionality, such as non-parallel shared container and BASIC transformer, are automatically constrained to run on conductor node 304-2. A user may set an option to run a parallel job in one process on conductor node 304-2. In that case, the job will not run via resource manager 316 as it would be pointless to run with resource manager 316, lock a compute node, and only create one process utilizing one CPU letting other CPUs idle. A configuration file containing only the conductor can be used in this case. The generated configuration file adds the conductor node to a default node pool. Otherwise the lack of compute nodes means that no nodes are available in that pool.

Job Sequence

Job sequences can help maximize usage of a single node to concurrently run as many as 3 or 4 jobs using the same configuration file when there is no dependency between the jobs. In addition, job sequences allow a job to use data generated from another job. Further, using the same configuration file between jobs running concurrently limits the time spent waiting for resource manager 316.

Not all jobs will use the CPU resources available on a single node. It is a performance consideration to run as many jobs as possible with control of what's running at the same time on a node. Resource manager 316 cannot manage what runs at the same time concurrently. A job sequence can manage concurrency and CPU utilization.

Grid support for job sequences will support two main use cases. These may be regulated by a checkbox on a resource requirement screen presented on a sequence properties screen to a user:

All parallel jobs in the sequence that do not have a static configuration file will run with the same configuration file, based on resource requirements defined at the sequence level. Job-level resource settings are ignored Jobs in the sequence may run with their own resource settings; sequence-level resources will not be imposed on jobs.

Whenever resource allocation is required for a sequence, this takes place at the start of the sequence. Resources are held until the completion of the sequence; they are not freed between job runs inside the sequence. In other implementations, resources may not be obtained until needed (e.g., when a first job in the sequence is ready to run). Additionally, resources may be freed when a last job has finished using them.

Job Batch and Job Control

Job batches and jobs run using other forms of job control will, in general, run with their own resource requirements. In the case where a parallel job has job control and a controlled job has its configuration file setting set to a parent job's configuration file setting, the controlled job must run with the parent job's configuration file.

Job Deployment

Node pool names in master configuration file templates are used to interpret the same resource requirements in different environments. Data containing the resource requirements is exported with job designs. Take the reserved DB2 node pool names as an example. The 'DB2V8' node pool consists of one physical server for DB2 version 8. The 'DB2V9' node pool consists of one physical server for DB2 version 9. A master configuration file template in the development environment can be written as:

```
{
    node "CONDUCTOR"
    {
        fastname "development_conductor_node"
        pools "conductor"
        resource disk "/u1/Datasets" {pools ""}
    }
    node "DB2_v8_0"
    {
        fastname "development_db2_v8_0"
        pools "DB2V8"
        resource scratchdisk "/u1/Scratch" {pools ""}
    }
    node "DB2_v9_0"
    {
        fastname "development_db2_v9_0"
        pools "DB2V9"
        resource scratchdisk "/u1/Scratch" {pools ""}
    }
    node "COMPUTE"
    {
```

-continued

```
        fastname "$HOSTNAME"
        pools ""
        resource disk "/u1/Datasets" {pools ""}
        resource disk "/u1/Lookup" {pools "lookup"}
        resource disk "/u1/SurrogateKey" {pools "keystate"}
        resource scratchdisk "/u1/Scratch" {pools ""}
    }
}
```

Similarly, the master configuration file template in production can be written as:

```
{
    node "CONDUCTOR"
    {
        fastname "production_conductor_node"
        pools "conductor"
        resource disk "/u1/Datasets" {pools ""}
    }
    node "DB2_v8_0"
    {
        fastname "production_db2_v8_0"
        pools "DB2V8"
        resource scratchdisk "/u1/Scratch" {pools ""}
    }
    node "DB2_v8_1"
    {
        fastname "production_db2_v8_1"
        pools "DB2V8"
        resource scratchdisk "/u1/Scratch" {pools ""}
    }
    node "DB2_v9_0"
    {
        fastname "production_db2_v9_0"
        pools "DB2V9"
        resource scratchdisk "/u1/Scratch" {pools ""}
    }
    node "DB2_v9_1"
    {
        fastname "production_db2_v9_1"
        pools "DB2V9"
        resource scratchdisk "/u1/Scratch" {pools ""}
    }
    node "DB2_v9_2"
    {
        fastname "production_db2_v9_2"
        pools "DB2V9"
        resource scratchdisk "/u1/Scratch" {pools ""}
    }
    node "DB2_v9_3"
    {
        fastname "production_db2_v9_3"
        pools "DB2V9"
        resource scratchdisk "/u1/Scratch" {pools ""}
    }
    node "DB2_v9_4"
    {
        fastname "production_db2_v9_4"
        pools "DB2V9"
        resource scratchdisk "/u1/Scratch" {pools ""}
    }
    node "COMPUTE"
    {
        fastname "$HOSTNAME"
        pools ""
        resource disk "/u1/Datasets" {pools ""}
        resource disk "/u1/Lookup" {pools "lookup"}
        resource disk "/u1/SurrogateKey" {pools "keystate"}
        resource scratchdisk "/u1/Scratch" {pools ""}
    }
}
```

The differences between these two environments are the number of DB2 partitions and the fastnames of DB2 servers. Fastnames are not persistent during job deployment as those names are not consistent across different environments. The only candidate is the node pool name which can link the DB2 installs in different environments. Hence, node pool names must be consistent across master configuration file templates in different environments.

For node map constraints, logical node names must be consistent as well. Use of node pool names means that a different number of servers may be used in the development and the production environment. For example, in production there may be eight machines in the 'DB2V9' pool, but in the development environment there may only be one machine in the 'DB2V9' pool.

Suppose three development projects use the DB2 installs discussed above. The first project uses DB2 version 8, the second uses DB2 version 9, and the third uses both version 8 and version 9. When a configuration file is to be generated for a job in the first project in the production environment, "DB2V8" is used to lookup the node entries of the DB2 version 8 install from the master configuration file template and those node entries are included in the generated configuration file. A sample configuration file with static server names resolved is given below:

```
{
    node "CONDUCTOR"
    {
        fastname "production_conductor_node"
        pools "conductor"
        resource disk "/u1/Datasets" {pools ""}
    }
    node "DB2_v8_0"
    {
        fastname "production_db2_v8_0"
        pools "DB2V8"
        resource scratchdisk "/u1/Scratch" {pools ""}
    }
    node "DB2_v8_1"
    {
        fastname "production_db2_v8_1"
        pools "DB2V8"
        resource scratchdisk "/u1/Scratch" {pools ""}
    }
    node "COMPUTE"
    {
        fastname "$HOSTNAME"
        pools ""
        resource disk "/u1/Datasets" {pools ""}
        resource disk "/u1/Lookup" {pools "lookup"}
        resource disk "/u1/SurrogateKey" {pools "keystate"}
        resource scratchdisk "/u1/Scratch" {pools ""}
    }
}
```

Dynamic compute node names are resolved after the requested resources become available. A user can use job parameters to request a range of compute nodes at job design time. The resource requirement for the job contains these string parameters instead of fixed numbers. After job deployment, the user can specify the minimum and requested number of compute nodes to run the job. This provides the user an easy way of changing the number of partitions when needed without having to modify the job design. Both static and dynamic node resolutions for other two projects can be done in the same way.

Configuration File Generation

New functionality is developed for automatically and dynamically generating configuration files at runtime. Application 306 can generate the configuration file just before a job is executed. There are three major functions: node resolution for static servers, node resolution for dynamic compute nodes, and explicit node constraints by the pre-created configuration file.

Node Resolution for Static Servers

This step can be skipped for jobs that run on compute nodes only. Node pool requirements cause all the nodes in that pool to be included in the configuration file. The information on each node is looked up from the master configuration file template. Each node has its own entry defining the logical node name, server name, node pool name(s), and storage resources. In one implementation, generation of a configuration file may exclude nodes that are not required because of the use of node map constraints.

A conductor node will normally be included in the configuration file due to the following reasons:
- A parallel program must be started on a node in the configuration file.
- Descriptor files for datasets/filesets must be stored on the conductor node.
- The delete operator that removes the descriptor file of a dataset/fileset must run on the conductor node.

Node Resolution for Dynamic Compute Nodes

There are three parameters related to compute nodes. Users may specify the requested number of compute nodes and the number of logical nodes per requested compute node. Users can also specify the minimum number of compute nodes in case the requested number of compute nodes is not available.

The requested number of compute nodes can be transformed to a corresponding parameter used by resource manager 316. For example, the requested number of compute nodes N can be expressed as:

@node=N

A job command file containing the node keyword is submitted to resource manager 316. If N compute nodes are available, resource manager 316 returns a list of hostnames of the N allocated compute nodes via an environment variable. For a node with multiple processors, the hostname repeats for each processor. If the number of available compute nodes is less than N, the job is queued until N nodes become available. To avoid this situation, a user can specify a minimum number of compute nodes M. Resource manager 316 returns a list of hostnames of the M allocated compute nodes once M compute nodes are available. A node keyword takes the following expression:

@node=M, N

The number of partitions per compute node K determines how many processing nodes should be created for each allocated compute node. Take the first project discussed above as an example, where both N and K are equal to 2, and M is not specified. Resource manager 316 returns two compute nodes: production_compute_0 and production_compute_1. In the configuration file, there should be two processing node entries for each compute node. For simplicity, the processing node name may start with "COMPUTE_" plus logical node index. The following is a sample configuration file for this example:

```
{
    node "CONDUCTOR"
    {
        fastname "production_conductor_node"
        pools "conductor"
        resource disk "/u1/Datasets" {pools ""}
    }
    node "DB2_v8_0"
    {
        fastname "production_db2_v8_0"
```

```
        pools "DB2V8"
        resource scratchdisk "/u1/Scratch" {pools ""}
    }
    node "DB2_v8_1"
    {
        fastname "production_db2_v8_1"
        pools "DB2V8"
        resource scratchdisk "/u1/Scratch" {pools ""}
    }
    node "COMPUTE_0"
    {
        fastname "production_compute_0"
        pools ""
        resource disk "/u1/Datasets" {pools ""}
        resource disk "/u1/Lookup" {pools "lookup"}
        resource disk "/u1/SurrogateKey" {pools "keystate"}
        resource scratchdisk "/u1/Scratch" {pools ""}
    }
    node "COMPUTE_1"
    {
        fastname "production_compute_0"
        pools ""
        resource disk "/u1/Datasets" {pools ""}
        resource disk "/u1/Lookup" {pools "lookup"}
        resource disk "/u1/SurrogateKey" {pools "keystate"}
        resource scratchdisk "/u1/Scratch" {pools ""}
    }
    node "COMPUTE_2"
    {
        fastname "production_compute_1"
        pools ""
        resource disk "/u1/Datasets" {pools ""}
        resource disk "/u1/Lookup" {pools "lookup"}
        resource disk "/u1/SurrogateKey" {pools "keystate"}
        resource scratchdisk "/u1/Scratch" {pools ""}
    }
    node "COMPUTE_3"
    {
        fastname "production_compute_1"
        pools ""
        resource disk "/u1/Datasets" {pools ""}
        resource disk "/u1/Lookup" {pools "lookup"}
        resource disk "/u1/SurrogateKey" {pools "keystate"}
        resource scratchdisk "/u1/Scratch" {pools ""}
    }
}
```

Explicit Node Constraints by Pre-Created Configuration File

For debugging and performance tuning purposes, users may explicitly set an environment variable to a pre-created configuration file. No dynamic configuration file is generated in this case. Application 306 retrieves the fastname of each compute node from the given configuration file, and use resource manager 316 to request compute resources.

Job Compile

The configuration file is needed for compiling a job with transformers. A one-node configuration file, which only contains conductor node 304-2, could be used.

Job Validation

Application 306 can also generate a temporary configuration file for job validation. One difference between job validation and job execution is that the job is not submitted to resource manager 316 in job validation. Therefore, node resolution for dynamic compute nodes is not considered. However, application 306 still considers node resolution for static servers, and explicit node constraints by a pre-created configuration file.

The temporary configuration file only includes processing nodes associated with compute nodes if the job doesn't need to run on static servers. Node resolution for static servers needs to be done for jobs that require local access to static servers.

If a user specifies a pre-created configuration file for debugging or performance tuning purposes, the program uses the given configuration file as the temporary configuration file. Because no actual processes are created on physical compute nodes, the hostname of each compute is not required. A dummy fastname is used for each processing node. Take the first project discussed above as an example and suppose both N and K are equal to 2 and M is not specified. A temporary configuration file can be written as:

```
{
    node "CONDUCTOR"
    {
        fastname "production_conductor_node"
        pools "conductor"
        resource disk "/u1/Datasets" {pools ""}
    }
    node "DB2_v8_0"
    {
        fastname "production_db2_v8_0"
        pools "DB2V8"
        resource scratchdisk "/u1/Scratch" {pools ""}
    }
    node "DB2_v8_1"
    {
        fastname "production_db2_v8_1"
        pools "DB2V8"
        resource scratchdisk "/u1/Scratch" {pools ""}
    }
    node "COMPUTE_0"
    {
        fastname "dummy_hostname"
        pools ""
        resource disk "/u1/Datasets" {pools ""}
        resource disk "/u1/Lookup" {pools "lookup"}
        resource disk "/u1/SurrogateKey" {pools "keystate"}
        resource scratchdisk "/u1/Scratch" {pools ""}
    }
    node "COMPUTE_1"
    {
        fastname "dummy_hostname"
        pools ""
        resource disk "/u1/Datasets" {pools ""}
        resource disk "/u1/Lookup" {pools "lookup"}
        resource disk "/u1/SurrogateKey" {pools "keystate"}
        resource scratchdisk "/u1/Scratch" {pools ""}
    }
    node "COMPUTE_2"
    {
        fastname "dummy_hostname"
        pools ""
        resource disk "/u1/Datasets" {pools ""}
        resource disk "/u1/Lookup" {pools "lookup"}
        resource disk "/u1/SurrogateKey" {pools "keystate"}
        resource scratchdisk "/u1/Scratch" {pools ""}
    }
    node "COMPUTE_3"
    {
        fastname "dummy_hostname"
        pools ""
        resource disk "/u1/Datasets" {pools ""}
        resource disk "/u1/Lookup" {pools "lookup"}
        resource disk "/u1/SurrogateKey" {pools "keystate"}
        resource scratchdisk "/u1/Scratch" {pools ""}
    }
}
```

Job Execution

An execution mechanism in application 306 will produce a resource manager job command file based on resource requirements as well as explicit and implicit resource constraints. Resource manager 316 will search for requested resources, and then starts the job once those resources become available. In one implementation, the workflow of job execution for a parallel job is:

A job deployment request is submitted to data engine 310
Data engine 310 deploys job
Requirement to use resource manager 316 is determined
Data engine 310 changes status of job to "Queued"
Data engine 310 submits job command file to resource manager 316
Resource manager 316 examines and allocates the requested resources
Resource manager 316 calls data engine 310 when resources become available
Data engine 310 detects call from resource manager 316
Data engine 310 generates a job configuration file from resources allocated by resource manager 316
"Normal" job workflow progresses:
Job enters "Running" state
Performs before-job subroutine, if specified
Job starts to run The deployment request causes a "Queuing Job" message to be logged. A "Starting Job" message is not logged until resources become available. Once a job is queued, a "run" button can be disabled and a stop button can be enabled to prevent multiple submissions of the same job.

A control file of resource manager 316 is generated at job runtime rather than job compile time. This is because it needs to contain command line options. An example control file for a job "lltest" is shown below:

```
# @ job_type = parallel
# @ environment = COPY_ALL
# @ env_copy = master
# @ class = development
# @ node = 2
# @ job_name = lltest
# @ notification = never
# @ output = RT_SCTEMP/lltest.fifo
# @ error = RT_SCTEMP/lltest.fifo
# @ queue
/opt/IBM/InformationServer/Server/DSEngine/bin/uvsh "PHANTOM SQUAWK DSD.RUN lltest –4/0/1/0/0" > /dev/null
```

The job control file is run from a project home directory. A parallel master node can be defined along with a job class that uses the parallel master node as the first node for each job. Conductor node 304-2 can be defined as the parallel master node.

Keywords can be used to indicate whether a job is in the development class or the production class. The development class can be defined to use the parallel master node (e.g., the conductor node) as the first node to start the job. The command "environment=COPY_ALL" allows for the environment at job-submission time to be passed to a parallel conductor process. The job name is specified in "job_name=lltest".

The command "notification=never" disables the notification of job outcome in an email. The fifo specified in the "output" and "error" commands redirect all output to the fifo read by the parallel job wrapper code for data engine 310.

The example workflow above refers to a parallel job. The DSD.RUN internal interface is common between all data engine 310 jobtypes (i.e. all jobtypes except mainframe). It will be used in a similar manner for job sequences, in the case where resource allocation is required at the sequence level.

Job Control

Resource manager 316 may be configured with a way to stop an executing job or to cancel a queued job. This may be implemented by providing, for instance, a "stop" button in a user interface of application 306. Alternatively, if a pre-existing "stop" button exists, the pre-existing "stop" button can be extended so that a user can cancel a queued job as well as stopping an executing job.

Job Report

As already mentioned, various states of a job run are logged. Errors and other messages can also be logged. Since a configuration file may not be saved on a disk as a regular file, a log of a job run may be the only file that contains the content of a configuration file generated for the job at runtime. The log can be stored for later use. In one implementation, an environmental variable can be set to allow users to save generated configuration files on disk.

Non-Job Commands

Some commands, such as commands manipulating data produced from parallel data processing job, depend on resource configuration in order to run successfully. Thus, in one implementation, application 306 can generate temporary configuration files for certain non-job commands to run. Alternatively, a configuration file saved in a job run log may also be used.

This disclosure can take the form of an entirely hardware implementation, an entirely software implementation, or an implementation containing both hardware and software elements. In one implementation, this disclosure is implemented in software, which includes, but is not limited to, application software, firmware, resident software, microcode, etc.

Furthermore, this disclosure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Figure 8:
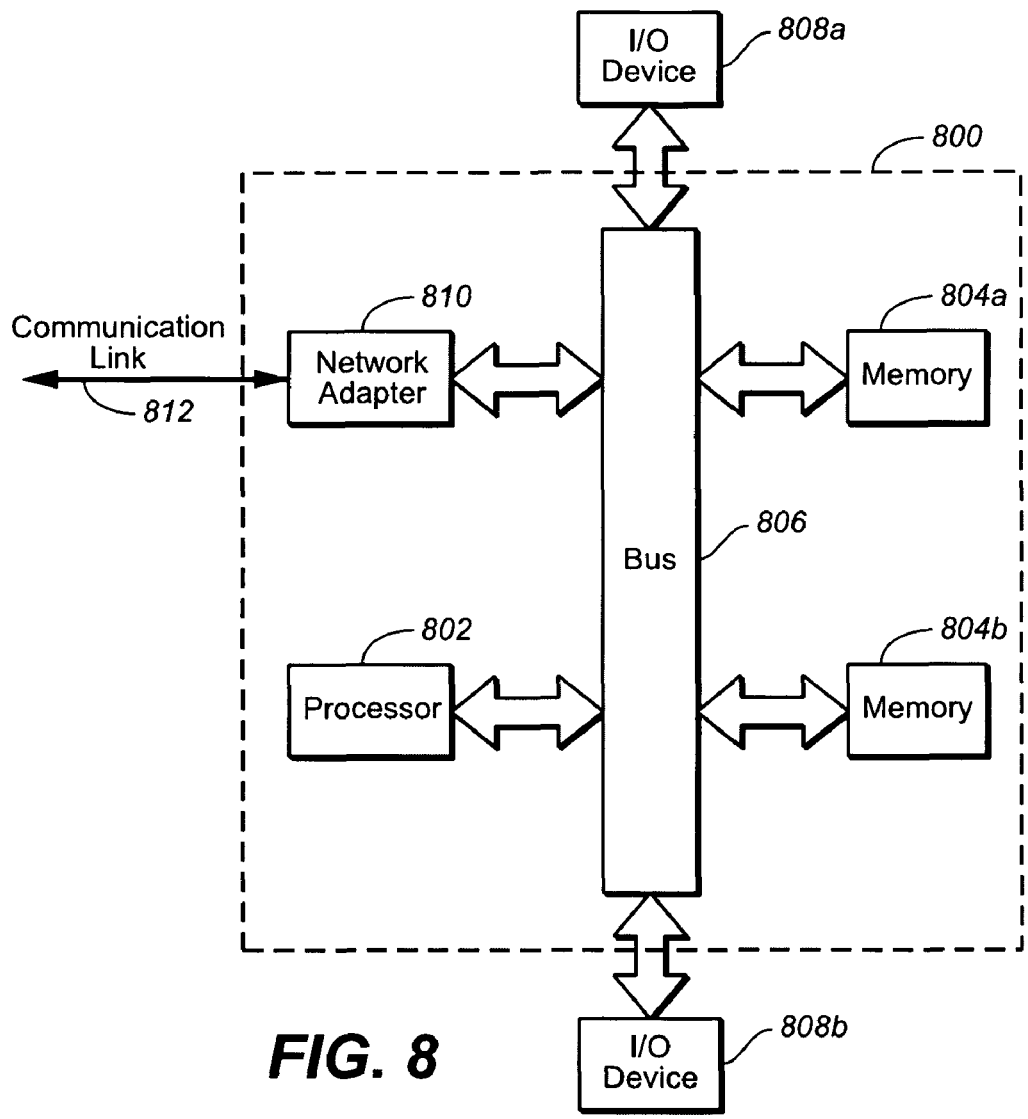
FIG. 8 is a block diagram of a data processing system with which implementations of this disclosure can be implemented.

FIG. 8 depicts a data processing system 800 suitable for storing and/or executing program code. Data processing system 800 includes a processor 802 coupled to memory elements 804a-b through a system bus 806. In other implementations, data processing system 800 may include more than one processor and each processor may be coupled directly or indirectly to one or more memory elements through a system bus.

Memory elements 804a-b can include local memory employed during actual execution of the program code, bulk storage, and cache memories that provide temporary storage of at least some program code in order to reduce the number of times the code must be retrieved from bulk storage during execution. As shown, input/output or I/O devices 808a-b (including, but not limited to, keyboards, displays, pointing devices, etc.) are coupled to data processing system 800. I/O devices 808a-b may be coupled to data processing system 800 directly or indirectly through intervening I/O controllers (not shown).

In the implementation, a network adapter 810 is coupled to data processing system 800 to enable data processing system 800 to become coupled to other data processing systems or remote printers or storage devices through communication link 812. Communication link 812 can be a private or public network. Modems, cable modems, and Ethernet cards are just a few of the currently available types of network adapters.

While various implementations for managing parallel data processing jobs in grid environments have been described, the technical scope of this disclosure is not limited thereto. For example, this disclosure is described in terms of particular systems having certain components and particular methods having certain steps in a certain order. One of ordinary skill in the art, however, will readily recognize that the methods described herein can, for instance, include additional steps and/or be in a different order, and that the systems described herein can, for instance, include additional or substitute components. Hence, various modifications or improvements can be added to the above implementations and those modifications or improvements fall within the technical scope of this disclosure.

The invention claimed is:

1. A method for managing parallel data processing jobs in grid environments, the method comprising:
   receiving a request to deploy a parallel data processing job in a grid environment;
   dynamically allocating at runtime a plurality of resource nodes in the grid environment to the parallel data processing job;
   automatically generating a configuration file for the parallel data processing job based on the plurality of resource nodes dynamically allocated; and
   executing the parallel data processing job in the grid environment using the configuration file, wherein dynamic allocation of the plurality of resource nodes to the parallel data processing job is based on resource requirements specified for the parallel data processing job and a configuration file template for the grid environment,
      the resource requirements for the parallel data processing, job specifying a plurality of node pools to be used for the parallel data processing job,
      the configuration file template mapping each of the plurality of resource nodes dynamically allocated to the parallel data processing job to one of the plurality of node pools specified in the resource requirements.

2. The method of claim 1, wherein the configuration file template for the grid environment is a job level template that only includes information on node pools useful for the parallel data processing job.

3. The method of claim 1, wherein the resource requirements for the parallel data processing job further specifies a number of nodes from each of the plurality of node pools to be used for the parallel data processing job.

4. The method of claim 1, wherein the parallel data processing job was designed in an environment different from the grid environment.

5. The method of claim 1, wherein the parallel data processing job is deployable in an environment different from the grid environment without having to be modified.

6. The method of claim 1, wherein the parallel data processing job is part of a job sequence and the configuration file generated for the parallel data processing job is used for executing another parallel data processing job in the job sequence.

7. A system for managing parallel data processing jobs in grid environments, the system comprising:
   a processor; and
   an application running on the processor, the application receiving a request to deploy a parallel data processing job in a grid environment, dynamically allocating at runtime a plurality of resource nodes in the grid environment to the parallel data processing job, automatically generating a configuration file for the parallel data processing job based on the plurality of resource nodes dynamically allocated, and executing the parallel data processing job in the grid environment using the configuration file, wherein dynamic allocation of the plurality of resource nodes to the parallel data processing job is based on resource requirements specified for the parallel data processing job and a configuration file template for the grid environment, the resource requirements for the parallel data processing job specifying a plurality of node pools to be used for the parallel data processing job, the configuration file template mapping each of the plurality of resource nodes dynamically allocated to the parallel data processing job to one of the plurality of node pools specified in the resource requirements.

8. The system of claim 7, wherein the configuration file template for the grid environment is a job level template that only includes information on node pools useful for the parallel data processing job.

9. The system of claim 7, wherein the resource requirements for the parallel data processing job further specifies a number of nodes from each of the plurality of node pools to be used for the parallel data processing job.

10. The system of claim 7, wherein the parallel data processing job was designed in an environment different from the grid environment.

11. The system of claim 7, wherein the parallel data processing job is deployable in an environment different from the grid environment without having to be modified.

12. The system of claim 7, wherein the parallel data processing job is part of a job sequence and the configuration file generated for the parallel data processing job is used for executing another parallel data processing job in the job sequence.

13. A computer program product comprising a non-transitory computer readable medium encoded with a computer program for managing parallel data processing jobs in grid environments, wherein the computer program, when executed on a computer, causes the computer to:

receive a request to deploy a parallel data processing job in a grid environment;

dynamically allocate at runtime a plurality of resource nodes in the grid environment to the parallel data processing job;

automatically generate a configuration file for the parallel data processing job based on the plurality of resource nodes dynamically allocated; and execute the parallel data processing job in the grid environment using the configuration file, wherein dynamic allocation of the plurality of resource nodes to the parallel data processing job is based on resource requirements specified for the parallel data processing job and a configuration file template for the grid environment, the resource requirements for the parallel data processing job specifying a plurality of node pools to be used for the parallel data processing job, the configuration file template mapping each of the plurality of resource nodes dynamically allocated to the parallel data processing job to one of the plurality of node pools specified in the resource requirements.

14. The computer program product of claim 13, wherein the resource requirements for the parallel data processing job further specifies a number of nodes from each of the plurality of node pools to be used for the parallel data processing job.

15. The computer program product of claim 13, wherein the parallel data processing job was designed in an environment different from the grid environment.

16. The computer program product of claim 13, wherein the parallel data processing job is deployable in an environment different from the grid environment without having to be modified.

17. The computer program product of claim 13, wherein the parallel data processing job is part of a job sequence and the configuration file generated for the parallel data processing job is used for executing another parallel data processing job in the job sequence.

* * * * *